United States Patent
Posey et al.

(10) Patent No.: US 6,911,255 B2
(45) Date of Patent: Jun. 28, 2005

(54) CLEAR BARRIER COATING AND COATED FILM

(75) Inventors: Robert Posey, Duncan, SC (US); Edwin C. Culbertson, Greer, SC (US); Jan C. Westermeier, Taylors, SC (US)

(73) Assignee: Mitsubishi Polyester Film, LLC, Greer, SC (US)

( * ) Notice: Subject to any disclaimer, the term of this patent is extended or adjusted under 35 U.S.C. 154(b) by 111 days.

(21) Appl. No.: 10/139,773

(22) Filed: May 6, 2002

(65) Prior Publication Data

US 2002/0187340 A1 Dec. 12, 2002

Related U.S. Application Data

(60) Provisional application No. 60/289,614, filed on May 8, 2001.

(51) Int. Cl.$^7$ .................. B32B 27/00; B32B 27/18; B32B 27/28; B32B 33/00
(52) U.S. Cl. .................. 428/336; 428/532; 428/523
(58) Field of Search ................. 428/500, 523, 428/507, 532, 515, 516, 336, 215

(56) References Cited

U.S. PATENT DOCUMENTS

| | | | |
|---|---|---|---|
| 3,322,553 A | 5/1967 | Seifried et al. ............... 117/7 |
| 4,186,015 A * | 1/1980 | Land et al. ................. 430/231 |
| 4,571,363 A | 2/1986 | Culbertson et al. ......... 428/332 |
| 4,927,689 A | 5/1990 | Markiewicz ............... 428/34.8 |
| 5,350,601 A | 9/1994 | Culbertson et al. ....... 427/412.1 |
| 5,552,479 A | 9/1996 | Tanaka et al. ................ 529/57 |
| 5,560,988 A | 10/1996 | Oba et al. .................. 428/339 |
| 5,574,096 A | 11/1996 | Tanaka et al. ................ 525/57 |
| 5,658,676 A | 8/1997 | Prissette et al. ............ 428/483 |
| 5,764,262 A | 6/1998 | Wu et al. .................... 347/101 |
| 5,773,092 A | 6/1998 | Prissette et al. ......... 427/385.5 |
| 5,861,216 A * | 1/1999 | Doane et al. ............... 428/532 |
| 5,972,472 A | 10/1999 | Uschold et al. ............. 428/141 |
| 5,984,467 A | 11/1999 | Bodager et al. ............ 347/101 |
| 6,143,408 A | 11/2000 | Fujita ..................... 428/355 R |
| 6,165,529 A | 12/2000 | Yang et al. ................. 426/310 |
| 6,168,857 B1 * | 1/2001 | Andersen et al. ........ 428/292.1 |
| 6,197,409 B1 | 3/2001 | Bodager et al. ............ 428/212 |
| 6,569,539 B2 * | 5/2003 | Bentmar et al. ............ 428/532 |
| 2002/0015854 * | 2/2002 | Billmers et al. ............ 428/500 |
| 2002/0061413 * | 5/2002 | Bentmar et al. ............ 428/480 |

FOREIGN PATENT DOCUMENTS

| | | |
|---|---|---|
| EP | 0698634 B1 | 2/1996 |
| EP | 0885919 | 12/1998 |
| EP | 0782931 B1 | 10/1999 |
| EP | 1086981 A1 | 3/2001 |
| FR | 2 273 642 | 1/1976 |
| GB | 1115464 | 5/1968 |
| GB | 1411564 | 10/1975 |
| WO | WO9822550 | 5/1998 |
| WO | WO9945045 | 9/1999 |

OTHER PUBLICATIONS

U.S. Appl. No. 60/332,742, Posey et al., filed Nov. 14, 2001.
European Search Report—Examiner Hallemeesch—Mar. 19, 2003.

* cited by examiner

*Primary Examiner*—Michael La Villa

(57) ABSTRACT

An oxygen barrier coating including polyvinyl alcohol and starch. The coating is applied to polymer film, and shows excellent oxygen barrier properties.

21 Claims, No Drawings

CLEAR BARRIER COATING AND COATED FILM

BACKGROUND OF THE INVENTION

1. Field of the Invention

The present invention relates generally to a method for creating a clear barrier film, typically a polymer film, by means of coating the product with a clear barrier coating containing polyvinyl alcohol and starch. The clear barrier coating is also disclosed.

2. Description of Related Art

Barrier coatings are desirable for many applications, such as food packaging. These barrier coatings limit transmission of oxygen and/or water vapor through the coated substrate. For many end uses, it is desirable for the coating to be clear. When the substrate is also clear, as in a transparent polymer film, view through the substrate is not obstructed. However, known barrier coatings have suffered from numerous limitations, including high cost, inadequate transparency and limited barrier properties. There is a need for barrier coatings that address one or more of these problems. A need also exists for barrier coatings that are adapted for application to polymer film substrates. Coatings adapted for in-line application during film manufacture are also desirable.

Known barrier coatings include polyvinylidene chloride-based coatings. These coatings are solvent based, which may render their coating processes environmentally hazardous. In addition, because of possible solvent residue in the coating, they may pose some risk when used to package food items. These coatings also are not reclaimable, and decompose to give off HCl vapors if recycled. Furthermore, such coatings are coated off-line after film orientation is complete. This requires thick coatings that are not economically optimal, and additional processing steps that render the coated film more expensive. Other known barrier films are polyvinyl alcohol based. However, these coatings do not perform well at high humidity levels. Off-line coatings using polyvinyl alcohol are also known.

BRIEF SUMMARY OF THE INVENTION

Accordingly, it is an object of the present invention to provide a barrier coating suitable for application to a base polymer film.

It is a further object of the present invention to provide a base polymer film with a barrier coating on one or both sides.

It is another object of the present invention to provide a barrier coating that is substantially free of streaks and smears, particularly when applied to a base polymer film.

It is yet another object of the present invention to provide a barrier coating that is substantially transparent.

It is a further object of the present invention to provide a barrier coating having good oxygen barrier properties.

It is another object of the present invention to provide a barrier coating that is cost efficient to make and apply.

It is a farther object of the present invention to provide a barrier coating that is suitable for food packaging.

It is another object of the present invention to provide a barrier coating that performs well at high humidity.

The present invention has accomplished these objectives by providing in a preferred embodiment a coated polymer film having a coating that includes a polyvinyl alcohol and starch, and optionally a surfactant and plasticizer. This coating is applied thinly via in-line coating methods to achieve a thin coating that provides good oxygen barrier properties.

DETAILED DESCRIPTION OF THE INVENTION

The present inventor has surprisingly found that excellent oxygen barrier properties are provided by a coating that includes an aqueous solution of polyvinyl alcohol, starch and surfactant when applied thinly to polymer film. Such coatings are known and commercially available for direct application to food products such as fruits and vegetables. Such application, via spray, dip, waterfall or other food coating methods, results in a thick coating. The present inventor has surprisingly found that good oxygen barrier properties are also obtained by a dramatically thinner coating applied to a base film such as polyester film. It is also believed that orientation of the film after application of the coating provides improved barrier properties than is provided by the unoriented coating.

Preferred barrier coatings of the present invention are disclosed in detail in U.S. Pat. No. 6,165,529, the disclosure of which is incorporated herein in its entirety by reference. As disclosed therein, preferred coatings include polyvinyl alcohol and starch. Preferably, the polyvinyl alcohol is a substantially hydrolyzed (preferably more than about 90%, alternately more than about 95%, alternately more than about 98%) cold water insoluble polyvinyl alcohol. The starch is preferably a cold water soluble starch. In addition, a surfactant is preferably added to the coating. Such a coating is commercially available as FreshSeal coating from Planet Polymer Technologies, Inc. of San Diego, Calif.

Because such coatings were designed for application in substantial amounts directly to fresh produce, they have been designated as safe for consumption and for contact with food. Thus, a polymer film coated with such a coating at greatly reduced thicknesses is ideally suited for food packaging and other uses requiring food contact or contact with other ingestible substances such as pharmaceuticals.

A preferred coating solution includes about 1 to about 20 percent by weight of polyvinyl alcohol, about 0.1 to about 10 percent by weight of starch, and optionally about 0.03 to about 5 percent by weight of surfactant (all percentages by weight based on the coating solution, except where specified). Preferred starches include maltodextrin. Preferred surfactants include lecithin, dioctyl sodium sulfosuccinate and combinations thereof. Antimicrobials, such as triclosan or methylparaben, can also be included. Plasticizers, such as glycerin, may also be added to the coatings of the present invention. An alternate preferred coating includes about 2 to about 7% polyvinyl alcohol, about 0.5% maltodextrin starch, about 0.05 dioctyl sodium sulfosuccinate surfactant and about 0.05% methylparaben antimicrobial.

The ingredients of the clear barrier coating are preferably formulated as a dispersion in water or a water-containing solvent. Alternatively, alcohols or other suitable organic solvents can be employed, alone or in combination with water. The solids level is preferably up to about 50 weight percent, alternatively about 0.01 to about 30 weight percent, more preferably about 1 to about 6 weight percent. The FreshSeal coating is available at a 10 percent solids level. It has been found that dilution to about 2 to about 3 weight percent provides the minimum coating thickness that gives good oxygen barrier properties, namely a thickness in the range of about 300 to about 400 Angstroms. In an alternate preferred embodiment, coating thickness is preferably from about 0.001 to about 5 microns, alternately about 0.03 to about 2 microns, or about 0.05 to about 0.5 microns.

Oxygen barrier properties are typically measured in cc mil/100 in$^2$/day. Oxygen barrier properties of about 0.3 cc mil/100 in$^2$/day (also known as cc.mil/ 100 in$^2$.day) are generally targeted for good barrier properties. Coatings of the present invention preferably provide even lower transmission rates of down to about 0.19 cc mil/100 in$^2$./day and below. Preferred oxygen transmission rates are below about 0.2 cc mil/100 in$^2$/day, alternatively below about 0.1 cc mil/100 in$^2$/day. Users typically desire any improvement in barrier properties, and this dramatic improvement is both unexpected and beneficial. Known polyvinyl alcohol coatings not incorporating starch are believed to have no better than 0.24 cc mil/100 in$^2$/day transmission rates. Thus, the coatings of the present invention provide a substantial improvement in barrier properties over known coatings. In addition, as referenced above, known film coatings containing polyvinyl alcohol have poor performance at high humidity. The coatings of the present invention are believed to address this limitation and to provide improved performance under conditions of high humidity.

It was not expected that such thin layers of the coatings of the present invention would provide such desirable barrier properties, let alone that they would be compatible with polyester film substrates and conventional film coating technology.

Water vapor transmission rates are also reduced by the coatings of the present invention. For optimal water vapor barrier properties, the coated polymer film (preferably polyester film) can be laminated to polyethylene films, such as those known to provide good water barrier properties.

While the films of the present invention are preferably transparent, and are referred to frequently as clear, the coatings and/or film substrates of the present invention do not need to be clear and may in various embodiments be opaque. Nonetheless, for many applications, transparent films and coatings are preferred. Total haze is a preferred method of measuring the clarity of a polyester film, which can determine its suitability for such films as clear barrier film. Haze is measured based on ASTM Method D1003-61, Procedure A, "Haze and Luminous Transmittance of Transparent Plastics", using a BYK Gardner "Haze Gard Plus" instrument.

Conventional additives that are known in the art can be included in the clear barrier coatings of the present invention. For example, pigments, other colorants, stabilizers, antistatic agents, adhesion promoters, antioxidants, delusterants, fillers, plasticizers and the like can be included in the clear barrier coatings of the present invention.

As mentioned above, while thin coatings are most cost-effective, the clear barrier coatings of the present invention are suitable for application at much higher levels, and for co-extrusion.

The coating compositions of the present invention can be formulated by simply combining the desired coating components. Agitation may be used to insure an even dispersion or solution.

The coating compositions of the present invention provide numerous benefits over known barrier coatings. The coating compositions of the present invention can be, and preferably are, formed without use of organic solvents. Thus, the coating composition and the dried coating can be substantially free of organic solvents. In certain embodiments, less than about 2% organic solvents are present, alternately less than about ½%, alternately 0%. The coating compositions of the present invention can be, and preferably are, used without a metal-containing layer. Thus, the coating composition and the coated film can be substantially free of metal, or alternatively the layer adjacent to the coating of the present invention can be substantially free of metal. In certain embodiments, metal is preferably present at less than about 1%, alternately less than about 0.1%, alternately less than about 0.01% in the coating layer or an adjacent layer. The coating compositions of the present invention typically do not include other known barrier coating components such as poly(meth)acrylic acids. In certain embodiments, it is preferred that less than about 1%, alternately less than about 0.05%, alternately less than about 0.01% poly(meth)acrylic acid is present. Excellent barrier properties are achieved without such additives. Thus, the coating composition and the dried coating can be substantially free of poly(meth) acrylic acid. In the context of this invention, "substantially free" shall mean containing less than an effective amount.

Base Film

For many preferred uses of the coating and method of the present invention, a polymer film substrate is most useful. It provides a lightweight, substantially transparent, inexpensive, disposable or recyclable substrate that accommodates many of the end uses of fog resistant materials. In addition, the coated polymer film can also easily be laminated by heat bonding or by adhesives to various other substrates.

The barrier coatings and coating methods of the present invention are applicable to any polymeric film capable of acting as a substrate for a barrier coating. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, of mixtures of two or more of the foregoing, are preferred for use in the present invention. Suitable glycols include ethylene glycol, diethylene glycol, polyethylene glycol, and polyols such as butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art.

In addition, the base polymer film may be a polymer laminate. Such laminates include polymer-polymer laminates like polyester-polyolefin or polyester-adhesive-polyolefin, polymer-metallic laminates such as polyester-aluminum, or polymer-paper or polymer-adhesive-paper laminates. Coated polymer films or film laminates can also be used. Primer coatings used to enhance wet-out or coating adhesion are preferred examples of such coatings.

The films may be produced by any well known technique in the art. For example, polyester is typically melted and extruded as an amorphous sheet onto a polished revolving casting drum to form a cast sheet of the polymer. The sheet is quickly cooled and then stretch oriented in one or more directions to impart strength and toughness to the film. The sheet is typically stretched from about two to about four times the original cast sheet dimension, in one or both directions. Biaxial orientation is most preferred, with mono-axial orientation being less preferred. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C.

As discussed above, the inventors have surprisingly discovered that orientation of the coated extruded polymer acts to improve the barrier properties of the film.

Alternate Substrates

As discussed above, the coatings and methods of reducing oxygen transmission of the present invention are not limited to use on polymer film bases. Alternate substrates such as metals, glass, polymeric articles and the like can be coated according to the teachings of the present invention. Furthermore, it is envisioned that polymer films coated with the coatings of the present invention can also be applied to other surfaces, including irregular surfaces, to provide clear barrier properties to those surfaces. The film may be heat bonded or adhered to the surface, or can be mechanically attached via fasteners, clips and the like.

Coating Methods

In-line coating of the base polymer layer, in which the coatings are applied during the film manufacturing process and before it is heat-set, is the preferred method for use of the coatings disclosed herein. Typically, the base polymer film is coated after corona treatment and prior to the stretch orientation of the film as described in British Patent No. 1,411,564, or coated between drawing steps (when biaxially oriented film is produced) as taught by U.S. Pat. No. 4,571,363, or coated post-draw as taught by U.S. Pat. No. 3,322,553.

In addition to in-line coating, one or more of the coatings of the present invention may be off-line coated (after manufacturing and heat setting the film), preferably after conventional surface modification of the polymeric substrate has occurred. Thus, the coating and method of the present invention are also intended for use where, for example, the base polymer film is produced and later coated off-line with one or more coatings of the present invention. Alternatively, one or more coatings can be applied in-line, with the remainder being applied off-line. Conventional off-line coating processes include roll coating, reverse roll coating, gravure roll coating, reverse gravure roll coating, brush coating, wire-wound rod (Meyer rod) coating, spray coating, air knife coating, meniscus coating or dipping.

While surface modification of the base polymer film prior to coating is not required, it has been found that better results are obtained if the surface or surfaces of the base polymer film are modified before application of the coatings of the present invention. Conventional surface modification techniques include corona treatment, which is the most common and most preferred procedure for modifying the surface of the polymer base film to enhance coating adhesion. The corona treatment or other surface modification should be sufficient to permit wetting out of the coating. Corona treatment of about 1.0 watt per square foot per minute is typically sufficient to achieve the desired results. In addition, primer or other intermediate layers can optionally be used between the polymer film and the clear barrier coating.

In light of the foregoing, a preferred method of controlling oxygen transmission through polymer film is provided herein. Preferably, one or both faces of a base polymer film are coated with a barrier coating of the present invention. Optionally, if only one face is coated with the barrier coating of the present invention, this coating can occur before, after or at the same time the opposite face of the base polymer film is coated with an alternate coating.

EXAMPLE SERIES

Biaxially oriented polyester film commercially available from Mitsubishi Polyester Film, LLC as Hostaphan 2400 was coated off-line with the commercially available Fresh Seal polyvinyl alcohol and starch coating at the solids levels indicated, to the following thicknesses. Oxygen transmission was measured using ASTM D3985 standard conditions of 23 degrees Celsius and 0% relative humidity.

| Coating solids (weight percent) | Coating Thickness (microns) | O2TR (cc mil/100 sq.in/day) |
|---|---|---|
| 2.0 | .48 | .028 |
| 1.75 | .40 | .029 |
| 1.50 | .36 | .046 |
| 1.25 | .29 | .053 |
| 1.00 | .23 | .070 |
| 0.75 | .18 | .090 |
| 0.50 | .10 | .17 |
| 0.25 | .06 | .24 |
| 0.10 | .02 | .48 |

The present invention having been thus described with particular reference to the preferred forms and embodiments thereof, it will be obvious to one of ordinary skill in the art that various changes and modifications may be made therein without departing from the spirit and scope of the invention.

What is claimed is:

1. An oxygen barrier film comprising:
   a polymer film layer; and
   an oxygen barrier coating on said polymer film layer,
   wherein said oxygen barrier coating comprises a polyvinyl alcohol and a cold water-soluble starch and has a thickness of about 0.001 to about 5 microns;
   and wherein an oxygen transmission rate of said polymer film layer plus said oxygen barrier coating is about 0.3 cc mil/100 in$^2$/day or less.

2. The film of claim 1, wherein said oxygen barrier coating is transparent.

3. The film of claim 1, wherein said oxygen barrier coating is substantially free of organic solvents.

4. The film of claim 1, wherein said oxygen barrier coating is substantially free of polyvinylidene chloride.

5. The film of claim 1, wherein said polyvinyl alcohol is at least about 90% hydrolyzed.

6. The film of claim 1, wherein said polyvinyl alcohol is cold water insoluble.

7. The film of claim 1, wherein said oxygen barrier coating further comprises a surfactant.

8. The film of claim 7, wherein said surfactant is selected from the group consisting of lecithin, dioctyl sodium sulfosuccinate and combinations thereof.

9. The film of claim 1, wherein said starch is maltodextrin.

10. The film of claim 1, wherein said coating has a thickness of about 300 to about 400 Angstroms.

11. The film of claim 1, wherein said coating has a thickness of about 0.03 to about 2 microns.

12. The film of claim 1, wherein said film has oxygen transmission rates of about 0.3 cc mil/100 in$^2$/day or less.

13. The film of claim 1, wherein said film has oxygen transmission rates of less than about 0.2 cc mil/100 in$^2$/day.

14. The film of claim 1, wherein said film has oxygen transmission rates of less than about 0.1 cc mil/100 in$^2$/day.

15. The film of claim 1, wherein said polymer film layer is a polyester film.

16. The film of claim 1, further comprising a polyethylene film layer.

17. The film of claim 1, wherein said polymer film layer is transparent.

18. The film of claim 1, wherein said oxygen barrier includes less than about 1% by weight of poly(meth)acrylic acid.

19. The film of claim 1, wherein said film includes less than about 1% by weight metal.

20. The oxygen barrier film of claim 1, wherein an oxygen transmission rate of said polymer film layer plus said oxygen barrier coating is about 0.2 cc mil/100 in$^2$/day or less.

21. The oxygen barrier film of claim 1, wherein an oxygen transmission rate of said polymer film layer plus said oxygen barrier coating is about 0.1 cc mil/100 in$^2$/day or less.

* * * * *